2,148,355

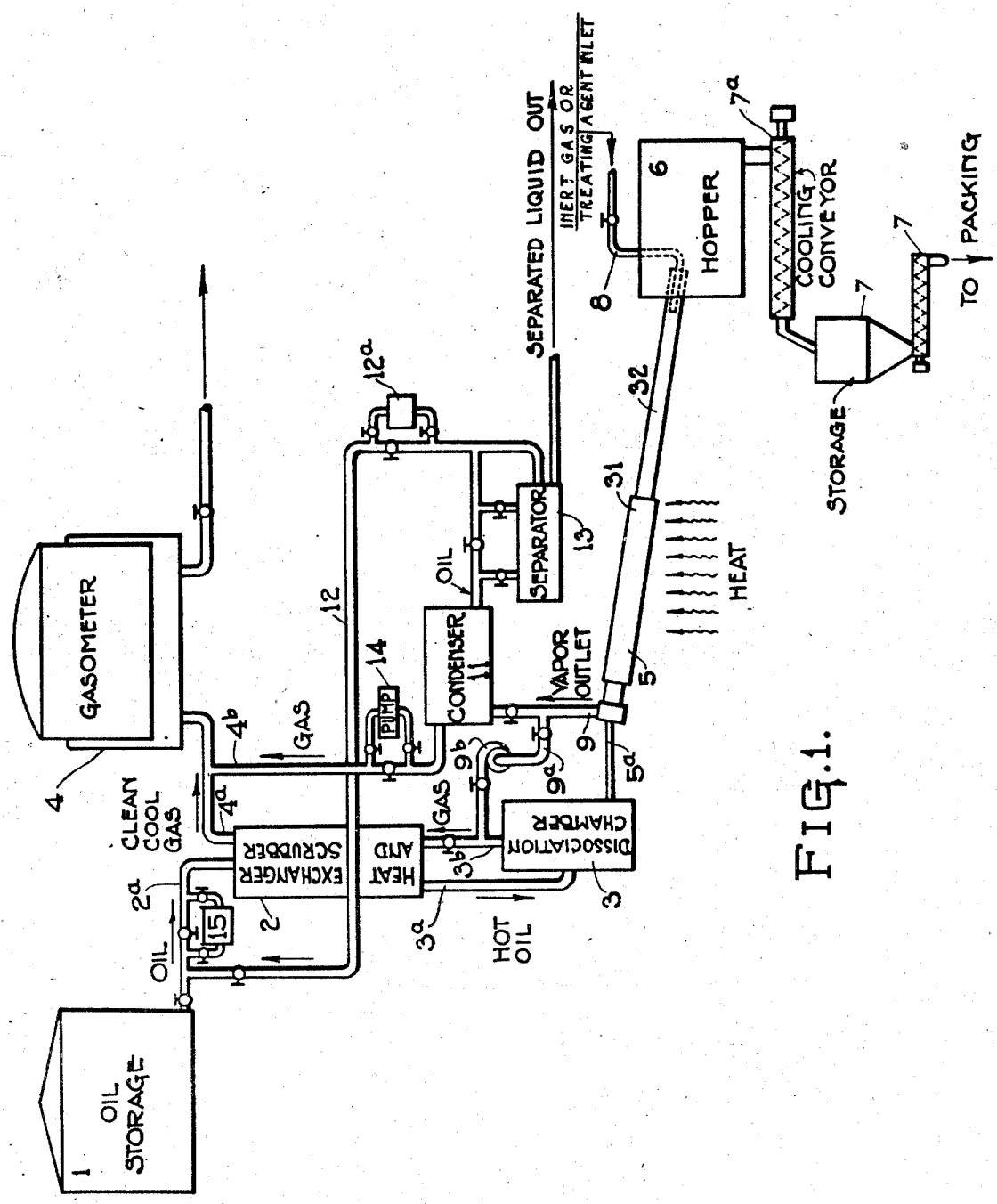

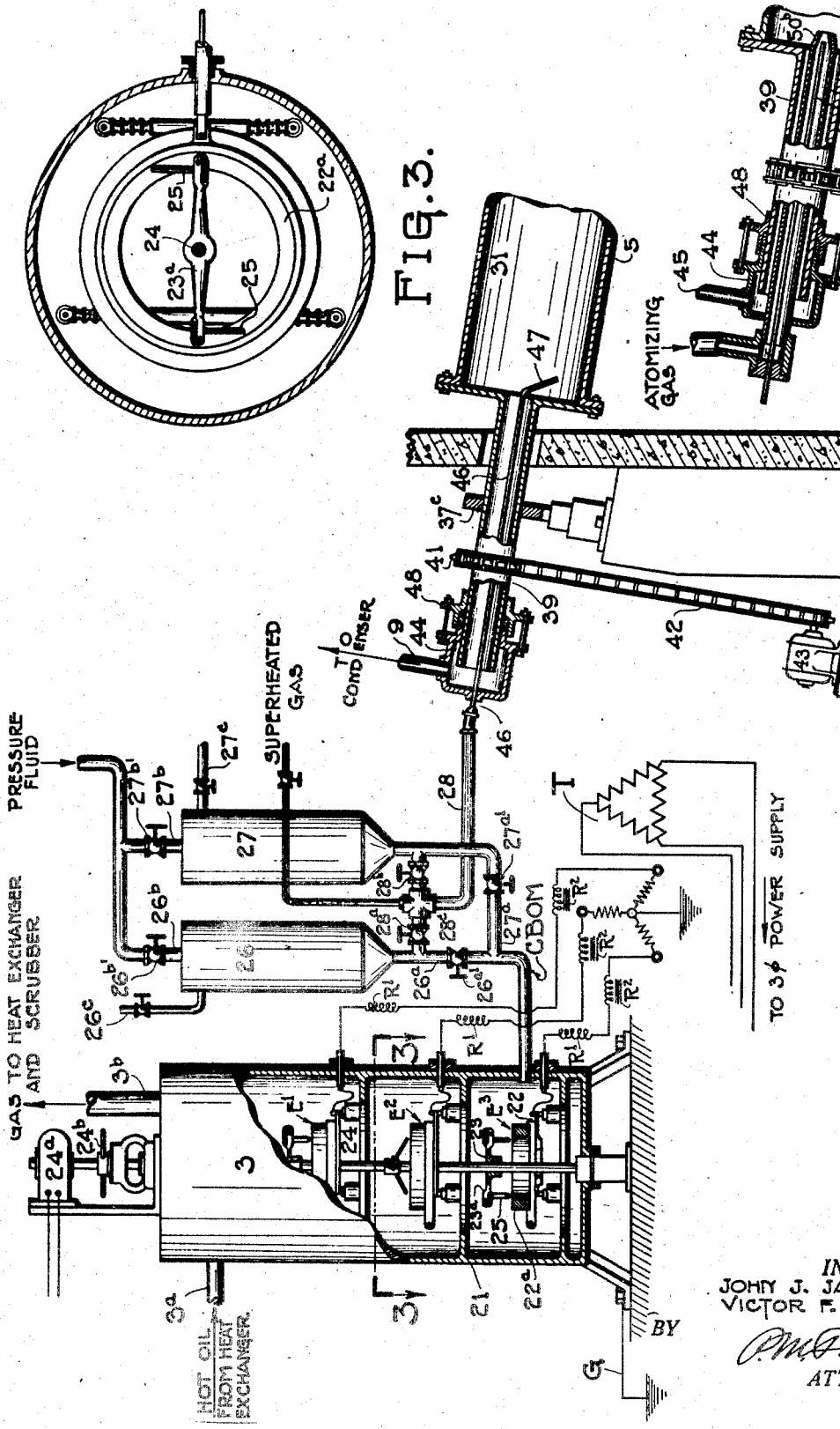
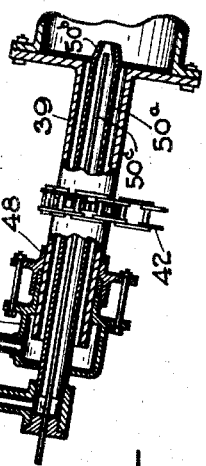

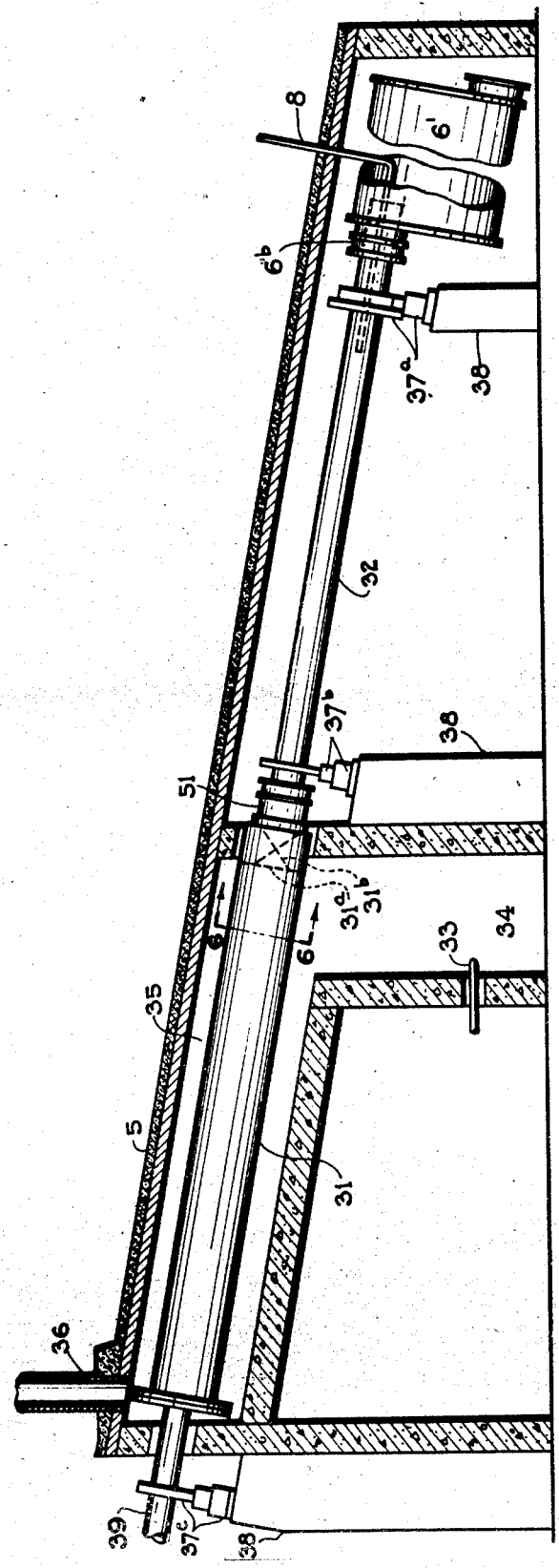
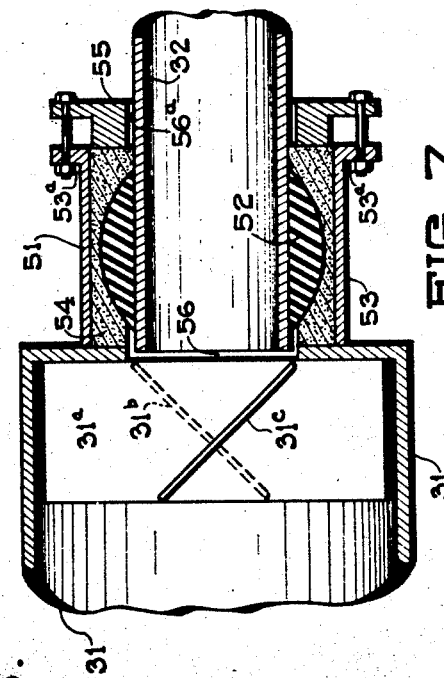
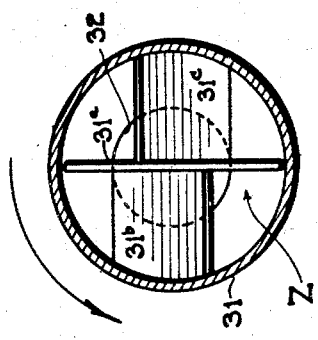
FIG. 5.
FIG. 6.
FIG. 7.
INVENTORS:
JOHN J. JAKOSKY,
VICTOR F. HANSON,
BY P. M. Paulson
ATTORNEY INVENTORS:
JOHN J. JAKOSKY,
VICTOR F. HANSON,
BY
*P. M. Paulson.*
ATTORNEY Feb. 21, 1939.  J. J. JAKOSKY ET AL  2,148,355
METHOD FOR PRODUCING CARBON BLACK
Original Filed March 31, 1933   5 Sheets-Sheet 5
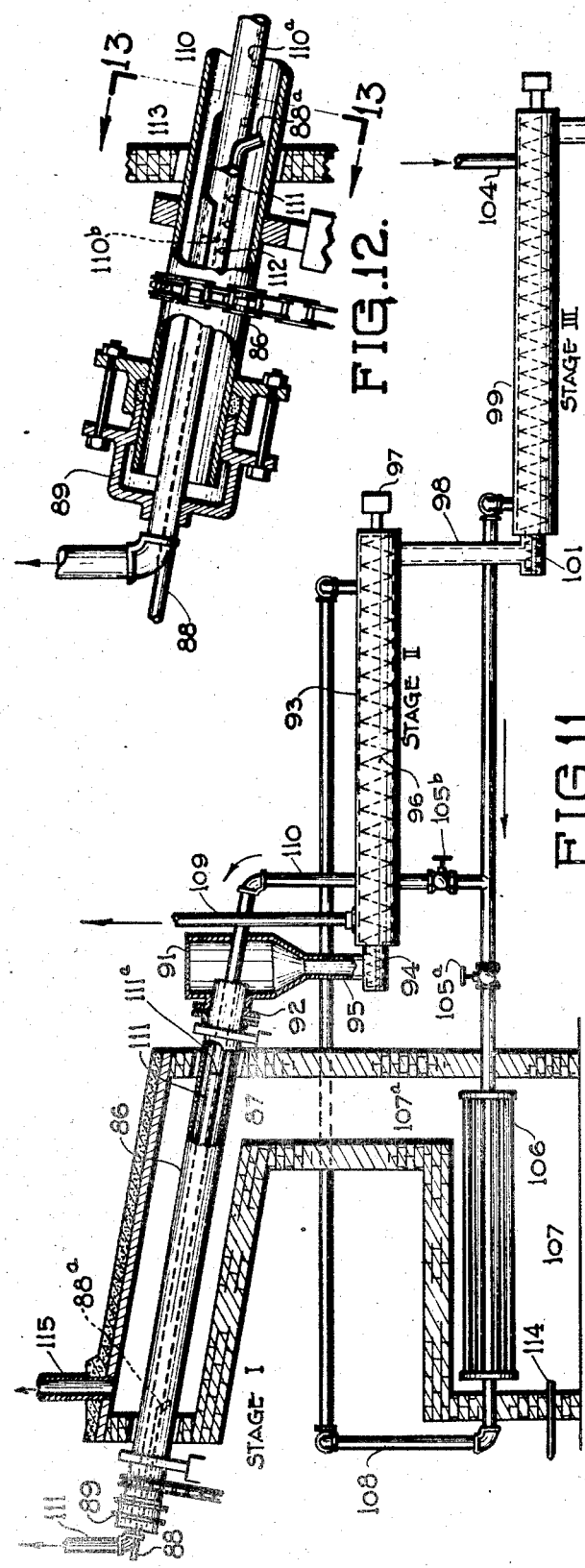
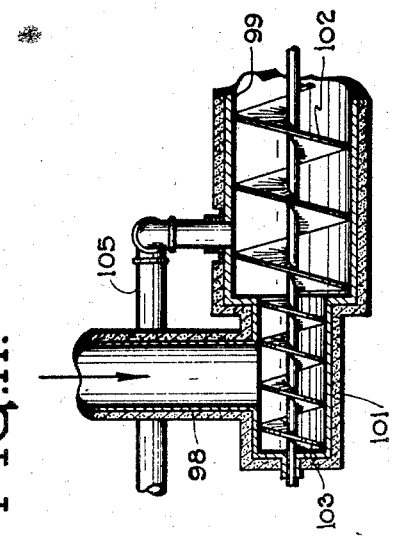
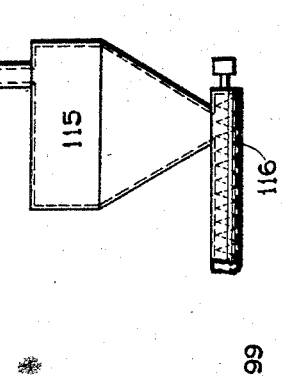
INVENTORS:
JOHN J. JAKOSKY,
VICTOR F. HANSON,
BY
*P. M. Paulson*
ATTORNEY Patented Feb. 21, 1939

UNITED STATES PATENT OFFICE 2,148,355

METHOD FOR PRODUCING CARBON BLACK

John J. Jakosky, Los Angeles, Calif., and Victor F. Hanson, Niagara Falls, N. Y., assignors to Electroblacks, Inc., Culver City, Calif., a corporation of Nevada Original application March 31, 1933, Serial No. 663,790. Divided and this application October 17, 1935, Serial No. 45,452

2 Claims. (Cl. 134—60)

This invention relates to the production of carbon-black, and particularly to methods involving the production of carbon-black in suspension in an organic or carbon-bearing liquid medium, as for example by electrothermal dissociation of such a liquid, and the separation of the carbon-black from such liquid medium by evaporation.

This application is a division of our co-pending application Serial Number 663,790, filed March 31, 1933.

The invention may be considered as comprising a method of heat-treating a mixture of carbon-black and an organic liquid, such as an oil, to effect a substantially complete separation of liquid and other impurities from the carbon-black and produce a carbon-black having certain characteristic properties which render it especially advantageous for certain purposes, such as rubber compounding. Such method of treatment may be applied either to a mixture of carbon-black and organic liquid obtained by the direct production of carbon black in suspension in such a liquid by electrothermal dissociation or other means, or to a mixture prepared by mixing an impure or inferior carbon-black or lamp-black product with a suitable organic liquid, the principal purpose of the treatment in the latter case being to alter or improve the properties of the black and obtain a superior grade of carbon-black having more desirable characteristics for certain purposes.

According to the methods of production of carbon-black by electrothermal dissociation of carbon-bearing liquids hitherto proposed, particularly as exemplified in Jakowsky Patent 1,597,277 and Jakosky Patents 1,673,245 and 1,872,297, the carbon-black was produced in a liquid medium consisting principally of carbon-bearing liquid from which the carbon-black was subsequently removed by filtration, centrifugal separation, evaporation (following concentration of the carbon-black by settling, filtration or the like), or by extraction with a suitable solvent.

Although various methods of separating carbon-black from oil suspensions have been proposed, it has been found that the only practical and satisfactory method for removal of the last portion of liquid from the carbon-black is by evaporation. The methods heretofore proposed have required that the carbon-black be subjected to a separate mechanical separating operation such as centrifuging, filtering, or settling, prior to the evaporation or thermal drying operation.

An object of the invention is to provide a method in which the necessity for mechanical concentration of the carbon-black-liquid-mixture is eliminated, by so conducting the process that the liquid separation may be effected entirely by evaporation, without requiring the furnishing of a prohibitively large amount of heat for this purpose.

In addition to other disadvantages the above-mentioned methods hitherto disclosed for production of a liquid-free carbon-black have been found unsuited to the production of carbon-black of the most advantageous properties for use in the rubber trade. The extraction method produces a rubber black which possesses the proper physical and chemical characteristics, but this method of separation has not been found economically feasible. Partial separation of the carbon-black from the liquid medium by filtration or centrifugal treatment must necessarily be followed by a more complete separation, such as by evaporation or extraction, and the cost is much higher than in the process of the present invention. Furthermore, it has been found that, when certain type oils are treated for the production of carbon-black, a filtration or centrifuging step prior to evaporation causes a compacting of the carbon-black particles so that, upon ultimate drying of these particles, a carbon-black is produced which is quite difficultly milled into rubber; a serious disadvantage as regards the use of the material in rubber compounding.

Removal of the residual liquid by previously proposed methods of direct evaporation from the carbon-black-oil-mixture, or of evaporation from a concentrated mixture obtained by filtration or centrifugal means, has been found impractical for the production of the higher quality blacks, for the reason that the residual carbon-bearing liquid is in part caused to "sinter" the carbon-black particles together, forming relatively dense "coked" particles or agglomerates of carbon which cannot be properly dispersed when milled into rubber. It has been found that this objectional "sintering" is apparently due to the relatively long heating period required in previous methods of this type, which results in the formation of certain gums or polymerization products from the residual carbon-bearing liquid or from the vapors thereof. These products, in turn, cause a cementing of the individual carbon-black particles into rather large and difficultly disintegrated agglomerates.

In the methods heretofore proposed for drying a mixture of carbon-black and oil by evaporation, the drying operation necessarily extends over a considerable period of time. This results in the formation of considerable quantities of gum and resinous materials. The conditions in the drying operation itself favor the formation of such gummy materials due to the relatively high unsaturation of the oil and the high temperatures existing during the drying operation. The amount of gum formed is influenced by the rate of vaporization as well as other conditions existing during the drying operation. The longer the drying time, the greater is the quantity of gummy materials formed. The greater the unsaturation of the oil and the higher its end point, the greater has been the amount of gum formed in the final black produced. It has been found that this percentage of gum can be greatly reduced by making the drying time as short as possible. Another factor which influences the percentage of gum formed may be termed the surface or contact effect. It has been found that gum formation is increased when an unsaturated oil is evaporated to dryness in contact with the heated walls of a metal container and/or with large masses of carbon-black at high temperature. Tests have shown that this percentage of gum can, therefore, be reduced by employing two conditions during the drying operation: (1) a rapid or instantaneous evaporation of a relatively large proportion of the oil from the black; and (2) minimizing the contact of the oil being evaporated, or the liberated vapors, with the retort walls or the partially dried black.

An important object of this invention, therefore, is to provide a method for effecting substantially complete separation of oil or organic liquid from carbon-black, by evaporation, under such conditions as to cause extremely rapid or "flash" evaporation of a considerable portion of such liquid and to also minimize contact of the liquid or the vapors thereof with heated walls or with heated masses or particles of carbon-black, and thus minimize the formation of gums or other polymerization products during such operation.

Furthermore, the presence of oxygen during the drying operation also tends to increase the formation of gums or other objectionable polymerization products. In addition, the presence of oxygen-bearing gases during the drying operation and the subsequent cooling of the black is objectionable due to the tendency of the carbon-black to take up or adsorb such oxygen or oxygen-bearing gases, which detract from the properties of the black, particularly when compounded with rubber, it having been found that such adsorbed oxygen or oxygen-bearing gases tend to cause deterioration of rubber.

Consequently a further object of the invention is to provide a complete process for production of carbon-black by electrothermal dissociation, and subsequent removal of liquid and cooling of the dried black, under conditions of substantial exclusion of oxygen.

A further important object of the present invention is to produce a carbon-black of admirable characteristics for use as a filler, particularly in rubber compounding, by a method involving separation of the carbon-black from hydrocarbon liquid and other undesirable constituents in such manner that the advantageous properties of such black with respect to such use thereof are preserved.

A further important object of the present invention is to provide a method for the production of carbon-black characterized by its substantial freedom from adsorbed or condensed gums, cementing materials, coking agents and hydrocarbons, and by its ease of proper dispersion by milling into rubber.

Other objects of the invention will be apparent in the following description, or will be specifically pointed out therein.

In one method of practicing the present invention, a carbon-bearing liquid is subjected to electrothermal dissociation under superatmospheric temperature and pressure conditions, to cause dissociation of a portion of said liquid to form carbon in highly comminuted state dispersed in the remaining liquid, and the resulting mixture or suspension of carbon in the remaining liquid is then subjected to a rapid evaporating operation at reduced pressure, to separate said remaining liquid from said carbon by evaporation thereof at a pressure lower than that maintained during such dissociation, and preferably at a pressure not in excess of atmospheric, to produce substantially pure, liquid-free carbon in the physical state commonly referred to as "carbon-black". The above-mentioned dissociation may be carried out by maintaining an electric arc discharge between electrodes submerged within a body of such liquid, and the evaporation of the remaining liquid from the carbon is preferably effected largely or wholly by flash-evaporation obtained by discharge of the mixture of carbon and liquid, while still at a high temperature, from the superatmospheric pressure under which the dissociation is conducted, into a drying chamber maintained at relatively low pressure. This flash-evaporation step may be followed by a further heating operation for the purpose of removing residual volatiles or liquids, if any, which may be present in said carbon-black after such flash-evaporation.

The dissociation step is preferably conducted under such temperature and pressure conditions as to provide for flash-evaporation of substantially all or a major portion of the residual carbon-bearing liquid from said carbon-black by the agency of the sensible heat of said liquid and said black, whereby a relatively small amount of additional heat is required for complete drying of said black following said flash-evaporation step.

Another important feature of the invention is that the dissociation of the carbon-bearing liquid may be carried out under conditions which allow for maintenance of high concentration of carbon-black in the liquid, which has hitherto been unattainable without excessive heat losses. According to this invention the electrothermal dissociation is preferably continued until a concentration of between 5 and 15 per cent of carbon-black by weight is obtained in the carbon-black-liquid-mixture, and the mixture is maintained during such dissociation under a sufficiently high pressure to permit substantially all of the heat delivered to the liquid by the electrothermal dissociation means to be retained in the liquid without causing excessive vaporization thereof in spite of the relatively low throughput of the liquid which is necessary to provide this relatively high concentration, and the heat thus retained in the oil is subsequently utilized in the evaporation of the remaining liquid from the mixture. After completion of the drying and heat treatment of the carbon-black, said black is subjected to a cooling operation, preferably in an enclosed chamber.

Another important feature of the invention is that the heat treatment of the black following flash-evaporation is carried out under conditions of progressively increasing temperature, and the vapors evolved during the flash evaporation and during said heating operation are removed from the carbon-black in such manner as to prevent contact of said vapors with carbon-black particles, or with heated wall surfaces, which are at a higher temperature than said vapors. This result may be attained, for example, by passing the carbon-black, following flash-evaporation, longitudinally through a drying chamber of progressively increasing temperature, and withdrawing evolved vapors longitudinally of said chamber in a direction opposite to the direction of travel of the carbon-black. If desired, the vapors may be positively removed from the chamber adjacent the position of evolution thereof, as by means of a perforated vapor outlet pipe extending longitudinally within the drying chamber.

The process of the present invention is preferably carried out under conditions which provide for substantially complete exclusion of oxygen, this being accomplished by maintaining the liquid undergoing dissociation, as well as the carbon-black in all the stages of production, in an atmosphere consisting principally of gases evolved by the electrothermal dissociation, or other oxygen-free gases. Such oxygen-free gases will be referred to hereinafter as "inert gases". It has further been found desirable in some cases to conduct the drying and cooling steps of the carbon-black production cycle in the presence of a counter-current stream of such an inert gas, whereby removal of volatiles from the carbon-black may be facilitated by a reduction of the partial pressure of such volatiles during the drying step and the carbon-black may be protected from contact by oxygen-containing gases during the cooling step.

The cooling procedure may, if desired, include the introduction of a suitable treating agent in vapor form to the cooling black so that said black is caused to cool in the presence of such an agent, as and for the purpose hereinafter set forth.

The above-described method is preferably carried out continuously, by continuously supplying a carbon-bearing liquid to the dissociation chamber and continuously removing the carbon-black-liquid-mixture therefrom and subjecting the same to flash-evaporation followed by heating and cooling, as above-described, and the gaseous dissociation products formed by the dissociation reaction (which may comprise hydrogen, methane, acetylene or the like) are preferably also continuously withdrawn from the chamber and passed in heat exchanging and scrubbing relation to the in-coming liquid, in such manner that the sensible heat of such gaseous products is utilized in heating such liquid, and in such manner that any carbon-black or condensible carbon-bearing liquid products carried by such gaseous products will be caused to enter the in-coming liquid stream and be thus returned to the dissociation chamber.

The carbon-black produced by the method herein described is characterized by certain physical properties, such carbon-black being preferably obtained in the form of small loosely bonded aggregates of carbon particles which may be readily crushed or milled into an impalpable powder, but which are possessed of sufficient physical strength to allow reasonable handling thereof without excessive "flying" or floating of the finer particles. The carbon-black obtained by practice of the present invention is particularly characterized by a definite vesicular or "honey-comb" structure of the individual aggregates above referred to.

The accompanying drawings illustrate one form of apparatus in which the method of the present invention may be carried out, and referring thereto:

Fig. 1 is a diagrammatic representation of one form of apparatus which may be used for practice of the complete invention;

Fig. 2 is a vertical section, partly in elevation, of the dissociation chamber and dryer-feed portions of the apparatus, on an enlarged scale;

Fig. 3 is a sectional detail of the form of carbon-black treater or dissociation chamber shown in Fig. 2, taken on line 3—3 therein;

Fig. 4 is a sectional detail of an alternative form of feeding device for the dryer;

Fig. 5 is a partly sectional side elevation of the drying apparatus shown diagrammatically in Fig. 1;

Fig. 6 is a transverse section thereof, taken on line 6—6 in Fig. 5;

Fig. 7 is an enlarged sectional detail of the means connecting together the upper and lower sections of the dryer;

Figure 8:
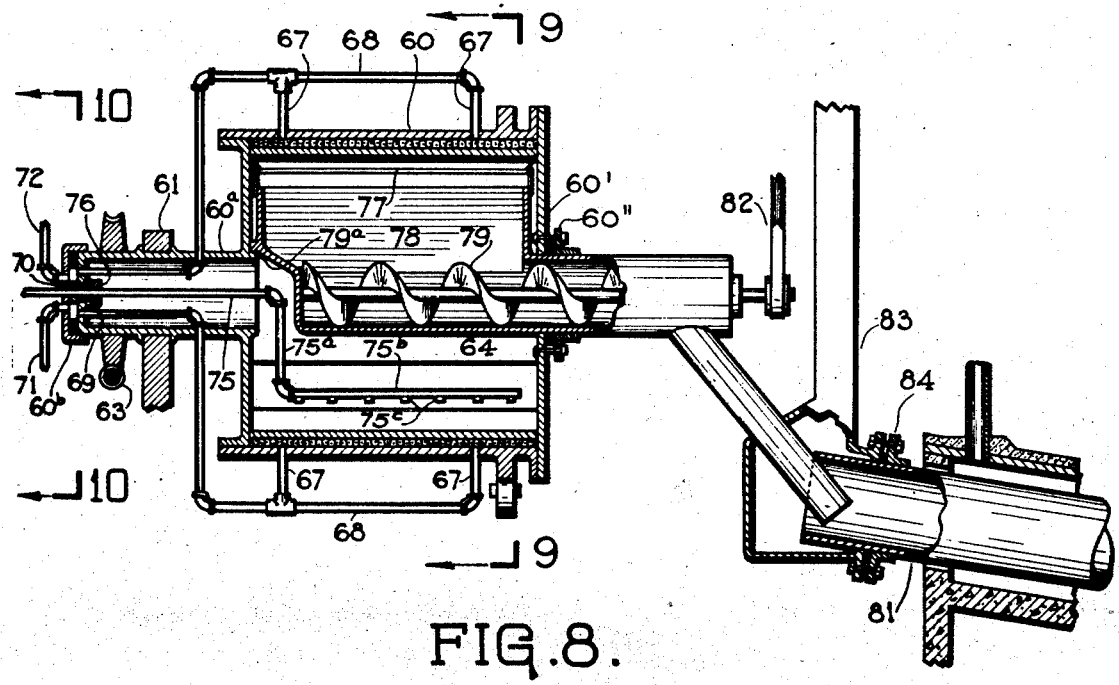
Fig. 8 is a partly sectional elevation of an alternative form of apparatus adapted for carrying out the flash-evaporation step of the present invention.
Figure 9:
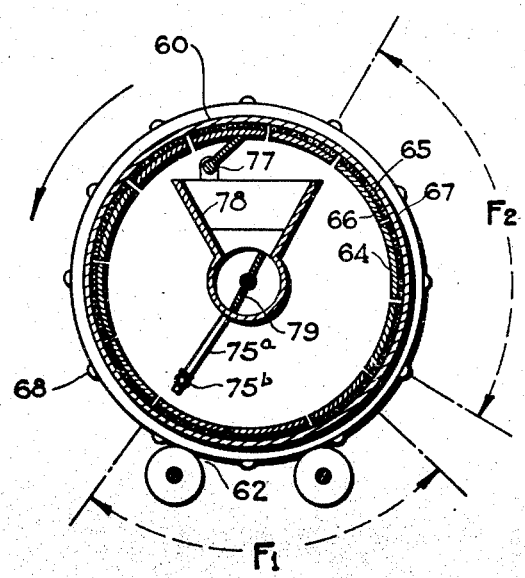
Figure 10:
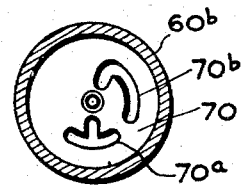

Figs. 9 and 10 are sectional details thereof, taken on lines 9—9 and 10—10, respectively, in Fig. 8;

Fig. 11 is a partly sectional elevation of an alternative form of dryer means, in which the drying operation is divided into three separate stages;

Fig. 12 is an enlarged sectional detail of the upper end portion of the first stage of the dryer shown in Fig. 11;

Fig. 13 is a transverse view taken on line 13—13 in Fig. 12;

Fig. 14 is an enlarged longitudinal section of a portion of the dryer shown in Fig. 11, showing a form of feeding means which may be used intermediate the several stages.

Fig. 1 shows a schematic layout of the various elements of apparatus which may be used in the practice of the method of the present invention, and pertains particularly to the manner in which the various elements are correlated to obtain the desired heat economies of operation; referring thereto; 1 is a storage receptacle for the carbon-bearing liquid (such a liquid being hereinafter referred to as "oil"), connected by a conduit 2a to a scrubber and heat exchanger 2 which is in turn connected to an electrothermal dissociation chamber 3 by means of an oil conduit 3a and a vapor conduit 3b. Said scrubber is adapted to receive gases from the chamber 3 through the conduit 3b and heat the oil supplied to said chamber from the storage receptacle 1, so that most effective utilization of the thermal energy in these gases may be had and at the same time cause the principal proportion of condensible vapors in said gases to be absorbed in the entering oil stream and returned to the dissociation chamber. Any carbon-black carried over from the dissociation chamber by the gas stream will also be removed from such gases by contact with the oil stream in said scrubber and returned to said chamber. The cooled and substantially clean gas is preferably conducted to a suitable gas-holder or gasometer 4 through a suitable conduit 4a.

Within the dissociation chamber 3 the oil is subjected to electrothermal dissociation which results in the formation of carbon-black within the oil, and the mixture of carbon-black and oil (hereinafter referred to as "Carbon-black-oil-mixture", and abbreviated "CBOM") is passed under pressure and at an elevated temperature to the inlet end of a suitable kiln-dryer 5, into which it is "flashed" and the principal proportion of the liquid allowed to evaporate substantially instantaneously. The kiln 5 is preferably of the rotary tube type and is provided with means for applying additional heat to the "flashed" carbon-black, in such manner that the partially dried carbon-black is allowed to progress from the inlet end into and through a progressively hotter drying zone or section 31 and thence through a cooling zone or section 32 into a suitable receiving hopper 6. Suitable means such as a screw conveyor 7a may be provided for removal of the cooler carbon-black from the hopper 6 to suitable storage means 7, from which it may be withdrawn by conveying means 7b and delivered to suitable packaging means, if desired. The present invention also contemplates subjecting the cooling carbon-black to the action of a suitable treating agent, subsequently described, and provision is made, as at 8, for the introduction of such agent. A suitable inert gas may also be introduced at 8 to facilitate removal of the volatiles from the carbon-black.

The vapors resulting from the flash-evaporation of the CBOM and the subsequent drying of the carbon-black are withdrawn from the kiln adjacent the inlet end thereof as at 9, and are passed to a cooling condenser 11, wherein the condensible portions of such vapors are separated and returned to the oil supply means, for example through the conduit 12 to the line 2a, and the non-condensible gases are passed through conduit 4b to the gasometer. In some cases, the liquid collected in condenser 11 may contain a liquid other than the condensed oil vapors; for example, if a treating agent is introduced at 8 which is immiscible with the condenser carbon-bearing liquid and in such cases, a suitable separator 13 may be connected to conduit 12, for example, as shown, to provide for separation of any such immiscible liquid. In the event that it is considered desirable to operate the dryer 5 at a sub-atmospheric pressure, a suitable pump 14 may be connected in the vapor line coming from the condenser 11. It may also be found desirable to provide a suitable pump in the conduit 12, for example as shown at 12a, to facilitate return of the condensed vapors from condenser 11 or separator 13 to the oil line 2a, this pump being of particular advantage when the condenser 11 is operated at a sub-atmospheric pressure.

In order to take advantage of the latent heat of the vapors discharged from the dryer, this thermal energy may be utilized to heat the oil supplied to the dissociation chamber. For this purpose, the vapors from the dryer 5 may be passed directly into the scrubber and heat-exchanger 2, as for example by means of a conduit 9a leading from the conduit 9 to the conduit 3b. A suitable pump 9b is preferably provided in the conduit 9a to facilitate transfer of the vapors from the conduit 9 to the conduit 3b.

It may also be found desirable or convenient to provide a pump in the line leading from the oil storage through the heat exchanger to the dissociation chamber, so that oil may be continuously forced into said chamber independent of the pressure maintained therein. This pump may be located in the oil line 2a entering the heat exchanger, as at 15, or this pump may be put in the oil line 3a adjacent the dissociation chamber 3 if desired.

Figs. 2 and 3 show the dissociation chamber 3 in more detail. Said apparatus is shown as being of the type shown and described in the pending application of Jakosky, Serial No. 588,146 and comprises essentially a casing or container 21 provided with a plurality of electrode units mounted within said casing and each comprising a relatively fixed and one or more relatively movable electrodes, there being, in the form shown, three of such units, indicated at $E_1$, $E_2$ and $E_3$.

Each electrode unit may comprise a relatively fixed ring-shaped electrode 22 whose upper face 22a constitutes an arcing face formed as a surface of revolution, of relatively small width in proportion to its circumferential length, and lying in a plane substantially perpendicular to its axis, and a relatively rotatable electrode holder 23 mounted on a rotatable shaft 24 and having one or more radial arms 23a each carrying a rod-shaped electrode 25 of relatively small cross-section disposed above the corresponding electrode surface 22a and inclined rearwardly with respect to the direction of travel of said electrode at a suitable trailing angle. The electrodes 22 and 25 may be formed of any suitable conducting material; for example, such electrodes may advantageously consist of carbon and may be manufactured in the same general manner as other carbon electrodes commonly employed for maintaining electric arcs. Power supply to the respective electrodes may comprise suitable connection to the several electrodes whereby electrical energy at the desired potential may be supplied thereto after the manner shown. It has been found convenient to insulate the ring electrodes 22 from the casing 21 and connect these electrodes each to a separate phase of a three-phase power supply system, which may comprise a suitable transformer T, through suitable reactances $R^1$ and $R^2$ or the like, while connecting the rotating electrodes to ground as at G through the common shaft upon which they are mounted, through the casing 21, as shown in Fig. 2.

It will be understood that suitable driving means, for example, a variable speed motor 24a, are provided whereby rotation of the shaft 24 may be had, and that adjustment means such as is indicated at 24b, are provided for determining, maintaining and adjusting the separation of the rotatable electrodes from the fixed electrodes through longitudinal movement of the shaft 24. The above mentioned means, for the purpose of the present description, may be substantially as shown and described in the above-referred-to pending application, Serial No. 588,146.

At the concentrations of carbon-black contemplated in the present invention, it is difficult to accurately govern by means of a valve the feed of the CBOM from the dissociation apparatus to the drying apparatus. Means are therefore provided for properly controlling this feed, and the form of feed-control means shown herein may comprise one or more montejus devices such as indicated at 26 and 27, provided at their lower ends with connection as at 26a and 27a to the dissociation chamber 3, and at their upper ends with pressure fluid connections 26b and 27b. The above-mentioned connections are provided with suitable valves indicated by prime marks on the respective reference numerals, as at 26a', etc. A line 28 connected to the bottom of both of the montejus devices through valved connections 28a and 28b leads to the inlet end of the dryer 5.

The montejus devices 26 and 27 may be provided with valved vents 26c and 27c at their upper ends.

When it is desired to feed CBOM into the dryer, one of the montejus devices, for example 26, is filled with CBOM from the dissociation chamber 3 by opening the valve 26a', with the valves 27a', 28a, and 26b closed. As the pressure in the dissociation chamber forces the CBOM into the montejus, the vent 26c may be cracked slightly so as to allow the montejus to fill, and the vent valve 26c and valve 26a' then closed. The valve 27b' is then opened to the desired degree to admit a suitable pressure fluid, such as a compressed hydrocarbon gas, to the montejus 26, and the valve 28a opened to allow the CBOM to be forced out through the line 28 to the dryer. While the montejus 26 is being emptied into the dryer, the montejus 27 may be filled as above described, and the respective montejus devices may be alternately operated, so that a substantially continuous withdrawal of CBOM from the dissociation chamber 3 and a substantially continuous supply of CBOM to the dryer is maintained.

The dryer 5 may comprise an elongated tube inclined downwardly from the inlet to the outlet end, provided with external heating means for the upper or inlet end portion, said heating means being preferably so disposed as to provide a zone of continuously increasing temperature downwardly from the inlet end to the lower end of said portion. The dryer, as shown in Figs. 5 to 7, may comprise an upper or heating section 31 and a lower or cooling section 32. The upper section 31 is preferably of greater cross-sectional area than the lower section 32, so that the carbon-black in descending through the upper section will occupy a relatively small proportion of the cross-sectional area of said section, whereby minimum contact of the released vapors with said black is obtained, while causing the carbon-black to occupy a relatively large proportion of the cross-sectional area of the lower section 32, thereby assuring better contact between the material and the dryer walls to facilitate transfer of heat from the black to said walls, and better contact between the black and the treating vapor or gas which may be passed upwardly through said lower section, as subsequently described. The upper section 31 is provided with heating means which may comprise a burner 33 directed into a fire-box 34 provided with a heating chamber or flue 35 built around the section 31 and having a stack 36 at the upper end thereof. This construction provides for maintaining a downwardly increasing temperature in the heating section 31 in such manner that the carbon-black descending through said section is exposed to continuously increasing temperature during its downward passage from the inlet end to the lower end of said section. The dryer may be rotatably mounted on suitable bearings 37a, 37b and 37c, which may rest on suitable supports 38.

Referring particularly to Figs. 2 and 4, the upper end of the upper section 31 is provided with a tubular extension 39, preferably of reduced diameter, on which is mounted a sprocket 41 through which the dryer may be rotated by means of a chain 42 and a motor 43. Said extension 39 extends within a fixed housing or vapor outlet chamber 44, provided with a vapor outlet connection 9 leading to the condenser 11 (Fig. 1). The CBOM supply line 28 is connected to an inlet pipe 46 which extends longitudinally through housing 44 and extension 39, said inlet pipe preferably terminating within the upper end portion of the dryer section 31 in position to discharge the CBOM into said section, preferably toward the side-walls thereof, as by means of a nozzle shown at 47. The chamber 44 is preferably also provided with a vapor-tight connection with the tubular extension 39, as by means of a stuffing-box 48.

The CBOM feeding means shown in Fig. 4 may, if desired, be used in place of the plain nozzle 47, so that a gas relatively inert at the temperatures involved, may be used to atomize the CBOM into the dryer. This alternative form of feeding means may comprise an atomizing gas line 50a extending longitudinally through the housing 44 and the tubular extension 39 and provided with a discharge nozzle 50b at its inner end, and a CBOM discharge line 50c extending within said line 50a and terminating adjacent said nozzle. This arrangement provides for introduction of CBOM into the dryer through the discharge line 50c simultaneously with the introduction of atomizing gas through the nozzle 50b, whereby said CBOM is atomized in its introduction to the dryer.

If desired, a super-heated gas may be introduced to the CBOM discharge line 28 at any suitable point for example such as at 28c, as shown in Fig. 2. It will be comprehended that any suitable type of gaseous agent may be introduced in this manner, for example, hydrogen, methane, or other suitable gas, such as that produced during the dissociation of the oil and consisting in general of a mixture of hydrogen and gaseous hydrocarbons. In some cases, steam may be introduced at this point, although we prefer, in general, to use an oxygen-free gas.

As shown in Fig. 5, the lower end of the dryer may be provided with a suitable hopper 6, to receive the dried carbon-black, the hopper being conveniently provided with a clean-out manhole 6a whereby the black may be removed at intervals, as desired. A suitable form of packing or stuffing-box means 6b is preferably provided for the hopper, so that escape of gases from the dryer can be prevented. It will be understood that a suitable continuous discharge means such as is shown at 7a in Fig. 1 may alternatively be provided for the hopper, if desired, for continually removing material from said hopper and conveying the same to a storage receptacle 7. An inlet pipe 8 may be provided, extending upwardly a short distance into the lower section 32 for introduction of a treating agent or inert gas into the drying zone.

At the junction of the sections 31 and 32, where a change in diameter of the two sections takes place, suitable means are provided for causing the dried carbon-black to enter the tube 32 in such manner as to prevent accumulation of dried black in contact with the side walls of the heating section at the lower end thereof. Such means, as shown in Figs. 5 to 7, may conveniently comprise a baffle plate 31a disposed diametrically across the lower end of the section 31 and two oppositely inclined scoop-plates 31a and 31b disposed at opposite sides of the plate 31a. The rotation of the dryer (in the direction indicated by the arrow in Fig. 6) will cause the scoop-plates to gather such dried black as may fall into the lower portion of the apparatus at the point indicated by the arrow Z and lift the same through a portion of a revolution of the dryer and then cause the black to pass by gravity into the upper end of section 32.

Fig. 7 shows a flexible coupling device 51 which may be provided for the purpose of securing the respective dryer sections 31 and 32 together during rotation of the dryer, while taking care of any eccentricities in the alignment of said sections due to heating effects. Said coupling means may comprise a spherical bearing member 52 secured to the upper end of the section 32 disposed within a housing 53 secured to and projecting axially from the end of the section 31 and provided at its outer end with a flange 53a, said housing and said bearing member 52 being secured together frictionally by means of packing material 54 which is kept under compression by means of a flange 55 bolted to the flange 53a, so that upon rotation of the section 31 by means of the motor 43, the frictional engagement of the packing material between the housing 53 and the bearing member 52 will cause a rotation of the section 32. A sufficient amount of play is left between the section 32 and the end of the section 31 as at 56, and between the flange 55 and the section 32, as at 56a, so as to accommodate any misalignment of the one section with respect to the other section. The bearing 37a at the lower end of the section 32 may be of such construction as to take up any thrust in said section, and preserve the longitudinal position of said section, while the upper bearing 37b on section 32 and the bearing 37c on section 31 may be allowed to float so that longitudinal expansion of the dryer will occasion no bearing difficulty. As the dryer expands the tubular extension 39 may slide with respect to the housing 44, through the stuffing-box 48.

In one method of practicing the present invention, a carbon-bearing liquid such as, for example, kerosene, Edeleanu extract, or other suitable liquid (any such liquid being generally referred to herein as an "oil"), is placed in the storage receptacle 1 and a supply of this oil is conveyed to the dissociation chamber 3 through the heat exchanger 2. With the electrodes 22 and 25 properly energized, an electric arc will be established between the arcing surfaces of said electrodes, causing dissociation of the carbon-bearing liquid or oil. This dissociation results in the formation of carbon-black in the liquid body in finely dispersed state and also results in formation of fixed gases such as acetylene, methane, hydrogen, and other gases, which are passed from the chamber to and through the heat exchanger 2, and thence to the gasometer 4 for storage.

The electric arcs within the dissociation chamber 3 evolve considerable heat, and the heat thus evolved is utilized to increase the temperature of the liquid body within the chamber to a suitable super-atmospheric temperature. According to the preferred embodiment of the present invention, the mixture of carbon-black and dissociable liquid is maintained under a super-atmospheric pressure within the dissociation chamber, sufficient to prevent boiling of the liquid at the temperature of operation, which temperature is preferably about equal to or in excess of the boiling point of the heaviest fractions of the liquid, at the pressure at which the subsequent flash-evaporation is conducted.

When a dissociable liquid such as kerosene is used for production of carbon-black according to the present invention it has been found practical to maintain a gauge pressure of 50 lbs. per sq. in. on the dissociation chamber, which pressure will allow of an average temperature of in the neighborhood of 500° F. to be attained by the CBOM within the treater without excessive gasification or vaporization of the dissociable liquid.

The dissociation is continued until a suitable concentration of carbon-black is realized in the mixture, the upper limit of this concentration being limited principally by the fluidity of the mixture. In general, the liquid is preferably caused to remain in the dissociation apparatus until the concentration of carbon-black therein has reached approximately the maximum value consistent with the above mentioned limitations. When kerosene is used as the dissociable liquid, this concentration may conveniently reach approximately 13% carbon-black under the temperature and pressure conditions above outlined, while concentration above this amount has been found to cause surface leakage on insulators within the dissociation chamber.

When a suitable concentration of carbon-black has been attained in the mixture within the dissociation chamber, this mixture may be withdrawn from the treater and introduced to one of the montejus devices 26 or 27, and fresh oil introduced to the treater, it being understood that the rate of withdrawal of the CBOM and the rate of supply of fresh liquid to the treater may be so balanced as to maintain a substantially continuous flow of liquid to and CBOM from this treater.

Referring to Fig. 2, when one montejus is filled with CBOM to the desired extent, the valves 26a', 26b', 26c, 27a', 27b', 27c, 28a and 28b are properly set so as to obtain delivery of CBOM from the montejus to the dryer, suitable fluid pressure being applied to the montejus so as to force the CBOM through the inlet line 28. It will be understood that the CBOM is preferably maintained under the above mentioned superatmospheric temperature and pressure conditions up to the moment of discharge thereof into the dryer section 31 and the montejus devices and the necessary supply pipes may be provided with suitable insulation for this purpose. When the CBOM is discharged into the dryer, which is maintained at a relatively low pressure preferably not in excess of atmospheric, the mixture will "flash", causing a vaporization of the major portion of the volatile matter in said mixture.

It will be comprehended that, dependent upon the concentration of carbon-black and the temperature and pressure at which the mixture is "flashed", the degree of vaporization of the volatile constituents of said mixture may be controlled within rather wide limits. It has been found disadvantageous to cause a complete vaporization of said constituents in the flashing operation for the reason that the carbon-black thus obtained is in the form of a very fine, almost impalpable powder, which is not only difficult to collect but is not preferred by the rubber trade inasmuch as it is very disagreeable to handle. In order to produce a carbon-black, therefore, which is properly dried yet in suitable physical condition, the present invention particularly contemplates flashing the CBOM under such temperature and pressure conditions and at such carbon-black concentration that the flash evaporation thereof results in the formation of lumps or loosely-bound agglomerates of carbon-black particles and a very small proportion of dust or substantially none at all. According to the preferred method of drying the CBOM, these loosely bound agglomerates have a "honey-comb" or vesicular appearance and structure similar to that of lava or other material which has solidified while evolving gases or which contained considerable quantities of gas during solidification. This honey-comb structure of the dried material allows it to be broken down with very slight mechanical pressure and this feature is of particular advantage in providing for better incorporation and dispersion of the material in rubber. The size of these agglomerates is preferably maintained on the order of a few millimeters in diameter, for example from 0.75 to 10 mm. in diameter.

When the mixture is flashed under such conditions as to produce lumps of the size and type above described it has been found desirable to subject the same to a further drying operation to remove the residual liquid and gaseous material. According to the preferred form of the invention, therefore, the CBOM produced as above outlined is flashed into a suitable heating zone under such conditions as to produce the above described lumps and therein and thereafter exposed to sufficient additional heating to completely remove the major proportion of volatiles therefrom.

When a dryer of the type herein disclosed is used, the CBOM is flashed into the upper section 31 and is allowed to pass downwardly through this section upon rotation thereof after the manner of the well known types of rotary dryers. Heat is applied to the exterior of this section of the dryer and the carbon-black is gradually brought to a temperature sufficient to drive out the volatile constituents. The temperature of the black at the lower end of the dryer section 31 may advantageously be as high as 1300° F. One of the particular features of this type of dryer is that the flashed carbon-black is moved downwardly through the dryer and is gradually brought to maximum temperature, while the gaseous products are driven upwardly past the descending black in such manner that these gases are caused to contact carbon-black and surfaces which are at a lower temperature than that of the gases whereby decomposition of these gases by such contact is minimized to a great degree, minimizing formation of the aforementioned condensation or polymerization products which cause a sintering of the material.

After passing through the dryer section 31 the black is fed into the dryer section 32 by means of the arrangement shown in Figs. 6 and 7 and is progressively cooled during its passage through said section 32, and then discharged into the hopper 6 from which it may be withdrawn to storage or packaging as desired.

The CBOM may be mixed with other materials before introduction into the dryer system, if desired, for example the CBOM may be flashed into the dryer by atomization thereof with a suitable atomizing gas, an arrangement such as shown in Fig. 4 being used for this purpose. This arrangement obtains a better evaporation of the liquid constituents of the CBOM, particularly in lowering the partial pressure of such constituents. In addition to assisting the evaporation, the presence of such gas appears to be advantageous in preventing undesirable caking at the CBOM discharge.

In addition to the above described means for assisting the evaporation of the liquid constituents from the CBOM, the flash-evaporation and subsequent-heating may be carried out under such conditions as to maintain a reduced partial pressure of the said volatile constituents, during the evaporating steps, which condition may be obtained by maintaining a subatmospheric pressure within the dryer or by passing a suitable inert-gas through said dryer by introduction of such a gas at 8, and establishing a stream of such gas through and over the drying black.

Instead of, or in conjunction with the introduction of an inert-gas for the purpose above outlined, the residual volatile constituents of the carbon-black may be replaced by a material the presence of which is of particular benefit in connection with the use to which the black is to be put. For example, pine-tar oil, stearic acid or other oils useful in the compounding of rubber may be introduced to the cooling-down portion of the dryer (dryer-section 32) through the pipe 8, and caused to contact the black and be absorbed thereby during the downward travel of the carbon-black. This feature provides for particularly intimate and uniform mixture of such agent with the black and in this manner a carbon-black product of highly advantageous characteristics with respect to a particular use may be obtained.

It will be understood that whenever an inert material is introduced with the CBOM into the dryer, or into the dryer through the inlet 8, the principal proportion of such material will be removed from the dryer through the vapor outlet 45 and will pass to the condenser 11 with the vapors liberated from the carbon-black or CBOM. Any treating agent such as pine-tar oil, stearic acid, or the like, which has been introduced to the cooling black through the line 8 and has not condensed on the black in the section 32 will pass from the dryer through the outlet 45 and thence to the condenser 11 where it will be caused to enter the oil stream as above described.

The form of apparatus shown in Figs. 8 to 10 is adapted to provide for a concentration of the CBOM obtained in the dissociation chamber 3 in a combined flash-evaporating and filtering step. The filter portion of this form of device is a modification of a "continuous filter" such as that shown and described in reissue patent to J. T. Shimmin No. 18,597, in which a plurality of filter surfaces are arranged to receive spray-discharged CBOM and obtain further concentration by filtration. Referring to the above-mentioned figures, the numeral 60 indicates a filter housing rotatably mounted as at 61 and 62 on suitable supporting means and provided with rotating driving means 63; the filter housing 60 is provided with a plurality of filter sections 64 disposed circumferentially around the inner periphery of said housing and each provided with a suitable supporting structure such as a screen 65 carrying a filter medium such as a woven wire cloth filter surface 66. Each of the filter sections 64 is provided with connections 67 leading from the space behind the filter support 65 and connecting to a conduit 68. The several conduits 68, the number of which corresponds to the number of filter sections 64, are brought readily inwardly of the filter housing 60 and lead into an axially projecting housing portion 60a and thence longitudinally of the apparatus to and through a manifold plate 69, which forms an end plate for the housing portion 60a. A valve plate 70 is provided adjacent the plate 69 and a cap member 60b is provided on the end of the housing portion 69a adapted to hold the valve plate 70 in position with respect to the plate 69. The valve plate is provided with valve openings 70a and 70b adapted to register with the open ends of the pipes 68 and connections 71 and 72 are provided extending through the cap member 60b in communication with the valve openings 70a and 70b, respectively. Connection 71 is preferably connected to suitable means adapted to provide a liquid suction, and the connection 72 is connected to means adapted to provide a vapor suction. The cap member 60b is preferably so disposed on the housing section 60a as to provide a gas-tight seal therewith.

The CBOM feed line 75 is brought into the filter through the cap member 60b, being provided with a suitable stuffing-box as shown at 76, and is provided within the housing 60 with a radially extending portion 75a having a longitudinally extending portion 75b disposed at a suitable distance radially inwardly of the filter sections 64, said section 75b being provided with a plurality of suitable discharge nozzles 75c directed toward the filter surface of said filter sections 64. The CBOM is delivered from the nozzles 75c under a suitable superatmospheric pressure and is sprayed or flashed downwardly onto the filter surfaces 66 of the adjacent filter section 64. As these filter sections pass the nozzles 75c a suction is applied thereto through the conduits 68 which are in communication with the connection 71 through the valve openings 70a and this suction will obtain a removal of a portion of the unflashed liquid content of the CBOM, which is drawn off through the connection 71 and may be returned to the dissociation chamber 3. After the filter sections have passed through a suitable portion of a revolution of the housing 60, for example through an arc such as indicated at F₁ in Fig. 9, the conduits 68 are disconnected from the suction line 71 and are connected to the suction line 72 through the valve opening 70b, and the portion of the revolution of the filter indicated at F₂ is utilized in the removal of gas from the interior of the filter 60 so as to maintain the same under sufficiently low pressure to provide the desired flash-evaporation. This gas may consist of fixed gases resulting from the dissociation step and vaporized constituents of the CBOM. The above described filtering operation results in the formation of a layer of carbon-black containing a materially low percentage of liquid constituents, and this layer is removed from the filter surface 66 as by means of a stripper or scraper 77 and caused to fall into a hopper 78, directed into a screw conveyor 79 and removed from the filter into a conduit 80 which is directed into the open upper end of a dryer 81, which may, if desired, be of the same general type as that shown at 5 in Fig. 1 and Fig. 5. A suitable driving means is provided for the screw conveyor 79, such as shown at 82, and a suitable vapor duct 83 is provided for the upper end of the dryer 81, corresponding to the vapor duct 9 shown in Fig. 2, suitable stuffing box means being provided as at 84 to obtain proper sealing of the rotating upper end of the dryer tube with the vapor duct.

It will be understood that suitable sealing means are provided for sealing the screw-conveyor to the filter, so that atmospheric air is not drawn into said filter, and mixed with the hydrogen and other gases therein. The filter housing 60 may be provided with an end plate 60', and the housing carrying the portions of the screw-conveyor which are exterior of the filter may be provided with stuffing-box means 60" at the point of passing through said end plate, to effect such sealing. It will be further understood that the entire filter housing 60 rotates with respect to the conveyor 79, and said conveyor passes rotatably through the end plate 60' and may be rotatably supported at the other end of said housing as at 79a.

The form of dryer shown in Figs. 11 to 14 is a modification of the form of dryer shown at 5 in Figs. 1 and 5, and comprises, essentially, a relatively low-temperature heating stage designated as stage I, a relatively high-temperature heating stage designated as stage II, and a cooling stage designated as stage III. Stage I of the dryer may comprise an inclined tube 86 rotatably mounted in a heating chamber 87 and provided with CBOM feeding means at the upper end thereof and carbon-black discharging means at the lower end thereof. The CBOM feeding means may comprise a conduit 88 extending downwardly into said tube through a fixed housing 89 mounted on the upper end of said tube in such manner as to provide a vapor seal therewith and at the same time permit rotation of the tube 86. At a suitable point within the tube 86, the conduit 88 may terminate in a CBOM discharge nozzle 88a, such point being preferably adjacent the upper end of the heating chamber 87. The lower end of the tube 86 may open into a suitable hopper 91 in position to discharge carbon-black thereinto, suitable vapor-sealing means being provided at the point of entrance of said tube to said hopper, such as a stuffing box 92.

The hopper 91 is adapted to deliver carbon-black downwardly into the stage II, which may comprise a tube 93, provided at one end with a portion 94 of reduced diameter, and the hopper 91 may be provided with a spout 95 opening into the portion 94. The tube 93 is provided with a screw-conveyor 96 having driving means 97 and adapted to carry the carbon-black from the portion 94 through the length of the tube 93 to the other end thereof, at which point a conduit 98 leading to stage III is disposed. Stage III may comprise a tube 99 provided with a reduced portion 101 after the manner of the portion 94 of the tube 93, and the conduit 98 is so disposed as to open into said portion 101. The tube 99 is provided with a screw-conveyor after the manner of the tube 93, Fig. 14 showing the construction of this conveyor in the vicinity of the reduced portion 101 in greater detail. The screw-conveyor may comprise a portion 102 of large diameter fitting within the tube 99 and provided with an extension 103 of reduced diameter and decreased pitch fitting within the portion 101. The particular arrangement shown is for the purpose of providing a relatively slow feed of carbon-black from the conduit 98 so that the reduced portion 101 may be maintained substantially full of such carbon-black while providing relatively faster feed of such carbon-black through the tube 99, so that such black will only partially fill the cross-section of said tube. The above described feeding arrangement is also preferably used between the stages I and II, although it will be appreciated that such specific construction is not the only means which may be provided for obtaining the desired feeding of the carbon-black, but it is an advantageous construction in view of the fact that to some extent a vapor seal is preferably provided between the several stages, for purposes hereinafter described, and the above construction will provide such a seal.

Means are provided for passing a suitable vapor through the several stages, and such means may comprise a conduit 104 leading into the discharge end of the tube 99 through which a suitable vapor or gas may be admitted, which gas will pass through the tube 99 and thence outwardly thereof through a conduit 105 connected through a heater 106 disposed in the fire-box 107 of the heating chamber 87 to a conduit 108 communicating with the discharge end of the tube 93. A conduit 109 leads from adjacent the inlet end of the tube 93 to storage, or other disposition. A by-pass conduit 110 is connected into the line 105 at a suitable point, and is led into the lower or discharge end of the tube 86, said conduit extending through the hopper 91 and upwarly into said tube 86 to adjacent the position of the upper end of the heating chamber 87 and there terminates in a closed end, for example as shown at 110b in Fig. 12. The portion of the conduit 110 lying within the tube 86 is provided with a series of perforations 110a adapted for discharge of vapor into said tube. Means are provided for removal of gas from the tube 86, and such means may comprise a conduit 111 having a closed lower end 11a extending from adjacent the lower end of the tube 86 upwardly through said tube along side the conduit 110, as shown in Fig. 13 for example, and outwardly through the fixed housing 89. This conduit may be connected to any suitable storage means, such as the gasometer 4, as desired. The portion of the conduit lying within the tube 86 is provided with a series of perforations 112 extending from adjacent the closed lower end upwardly to a point preferably somewhat above the point of CBOM discharge. The proportional dimensions of the conduits 110 and 111 with respect to the diameter of the tube 86 is preferably such as to allow sufficient room for the carbon-black to descend through said tube. If desired, the two conduits 110 and 111 may be disposed upwardly of the axial line of the tube 86 rather than axially of said tube. The two conduits are preferably provided with guard or baffle means such as a plate 113 disposed over said conduits in such manner as to prevent accumulation of carbon-black thereon.

In the operation of the form of dryer above described, the tube 86 is externally heated by heat delivered from the fire-box 107, provided with a burner or the like 114. The heated gases from the fire-box are directed to the lower end of the tube 86, as by means of a duct 107a, and are passed in contact with said tube upwardly toward the inlet end thereof through the heating chamber 87, and are discharged adjacent the upper end of said heating chamber through a suitable flue 115. The particular heating arrangement shown herein is for the purpose of providing means for progressively increased heating of the tube 86 downwardly from the inlet to the discharge end thereof.

Rotation of the tube 86 is obtained by suitable driving means, for example such as is shown at 41, 42 and 43 in Fig. 2 in connection with the dryer 5, and CBOM is supplied through the conduit 88 and discharged into the heated and rotating tube 86 at the nozzle 88a. The CBOM is flash-discharged into the tube and the carbon-black is gravitated downwardly through the tube to the discharge end due to the downward inclination and rotation of said tube. The carbon-black is discharged from the tube 86 into the hopper 91 and falls through the conduit 95 into the portion 94 of the tube 93, is carried through said tube 93 by the action of the conveyor 96 and fed into and carried through the tube 99 in the same manner as in the case of tube 93. A suitable cooling gas or vapor, such as the gas resulting from the dissociation chamber, is passed at a relatively low temperature into the discharge end of the tube 99 through the conduit 104 and is passed through the tube 99 in counter-current contact with the hot carbon-black. In this contact, the gas is materially heated and the carbon-black materially cooled; the cooled carbon-black being discharged from the tube 99 into a suitable hopper 115, from which it may be removed as desired by means of a conveyor 116 to suitable packaging means, not shown.

The gas which is passed through the tube 99 in heat-interchanging relation to the hot carbon-black, is withdrawn from said tube through the conduit 105 and a portion thereof is led through the heater 106 and thence through conduit 108 to the discharge end of the tube 93, and a further portion of said gas is passed through conduit 110 into the tube 86, suitable valve means being provided as at 105a and 105b in the respective conduits 105 and 110 whereby the proportional amounts of such gas are delivered to the desired portions of the apparatus. The portion of the gas passed through the heater 106 is heated to a relatively high temperature and is introduced into the discharge end of the tube 93 and passed therethrough in heating contact with the carbon-black present therein, after which said gas may be delivered through conduit 109 to storage or other disposition. The portion of the gas passed into the tube 86 obtains a reduction of the partial pressure of the volatiles released from the carbon-black undergoing heating in said tube, and is removed through the conduit 111 to storage or the like. The gas and vapors withdrawn from both drying tubes 86 and 93 may be introduced to the conduit 3b (Fig. 1) leading from the dissociation chamber 3, if desired, after the manner of the conduit 9a leading from the dryer 5, whereby condensible vapors may be recovered therefrom and the heat economies described in connection with the first-described form of apparatus may be realized.

The flash-discharged carbon-black is subjected to heat applied exteriorly of the tube 86 whereby the temperature of said black is gradually increased during its downward passage through said tube, and in addition to the heating obtained in the above manner, the heated gas passed into the tube 86 through the conduit 110 also obtains a degree of heat-interchange with said black and serves particularly to facilitate the removal of the principal proportion of the volatiles from said black by a reduction of the partial pressure thereof. Considerable drying of the black is obtained in the tube 86, but it is preferable that the temperature in this stage be kept somewhat below the maximum temperature required for complete drying, in order to minimize the formation of polymers or "cementing materials" as above described. For example, the temperature of the black in stage I may be kept below about 700 or 800° F., if desired, so as to provide for evaporation and removal of the major portion of the liquid under conditions which preclude heating thereof to an excessively high temperature, and the black may then be raised to a higher temperature in stage II, under conditions which do not favor the formation of such cementing materials. The gas introduced to stage II at the discharge end of the tube 93 may be at a temperature, for example, of from 1000° to 1300° F. and the carbon-black passing through this tube may be thus further heated at an increased temperature and the remaining volatiles removed solely through the agency of the counter-current stream of gas. It will be understood that the gas passed in cooling relation with the hot black in stage III and then passed through the heater 106 may be heated to any desired temperature in said heater, this operation cooling the burner gases in the fire-box 107 so that said burner gases will contact the tube 86 at a somewhat lowered temperature.

The drying operation is thus seen to be divided into three distinct stages: in stage I the CBOM is flash-discharged into a heated zone and caused to give up the major portion of its volatiles in the presence of a counter-current stream of gas adapted to lower the partial pressure of such volatiles and assist in the removal thereof; in stage II the carbon-black is further heated and the final portions of volatiles removed therefrom entirely through the agency of a heated gas passed counter-currently therewith; and in stage III, the carbon-black is cooled through the agency of a counter-current stream of gas and the thermal energy of said black utilized in raising the thermal energy of said gas, which is further utilized as above set forth.

The carbon-black is thus constantly maintained in a desired atmosphere, namely that of an inert gas, whereby the desirable characteristics of such carbon-black are preserved. At no time, from the moment of formation of said black until the packaging thereof, is it possible for any deleterious atmosphere, such as air for example, to come into contact with the black, and the cooling of the black in the presence of a desired atmosphere will cause the black to adsorb and become saturated with undeleterious vapors, whereby there is small tendency for subsequent adsorption of any other vapor or gas, such as oxygen, during handling of the black.

The above drying procedure also provides advantageous economies in fuel consumption in addition to the economies set forth in connection with the operation of the dryer 5, particularly in that the sensible heat of the hot carbon-black is utilized in heating the treating gas during the passage thereof through stage III. It will be further appreciated that any desired type of treating agent may be introduced to the black in stage III, such as the above-described pine-tar-oil, stearic acid or the like.

In addition to the heat and energy economies made possible by the present process, it will be further appreciated that the present process eliminates the objectionable filtration or solvent-extraction step required by previously disclosed methods. The advantages in this saving are tremendous from the standpoint of labor, and cost of equipment.

We claim:

1. In the recovery of carbon-black from mixtures of carbon-black and carbon-bearing liquid, the steps which comprise: heating such a mixture under superatmospheric pressure; subjecting the heated mixture to flash-evaporation at a lower pressure to cause rapid evaporation of a portion of the liquid therefrom in such manner as to leave sufficient of said liquid associated with the black to bind the particles thereof together in loosely bound agglomerates; separating the vapors so evolved from the carbon-black; and thereafter heating the carbon-black and remaining liquid to cause substantially complete vaporization of the remainder of said liquid.

2. In the recovery of carbon-black from mixtures of carbon-black and carbon-bearing liquid, the steps which comprise; heating such a mixture; subjecting the heated mixture to a flash-evaporating operation to cause vaporization of a portion of the liquid contained therein in such manner as to leave sufficient of said liquid associated with the black to bind the particles thereof together in loosely bound agglomerates thereafter; heating the carbon-black and remaining liquid in the presence of a stream of inert gas to cause vaporization and removal of a further portion of such liquid; and then heating the carbon-black to a higher temperature in the presence of an inert gas to substantially completely remove the remainder of said liquid.

JOHN J. JAKOSKY.
VICTOR F. HANSON.